(12) United States Patent
Kavsan

(10) Patent No.: US 6,412,069 B1
(45) Date of Patent: Jun. 25, 2002

(54) EXTENDING CRYTOGRAPHIC SERVICES TO THE KERNEL SPACE OF A COMPUTER OPERATING SYSTEM

(75) Inventor: Bronislav Kavsan, North Andover, MA (US)

(73) Assignee: SafeNet, Inc., Baltimore, MD (US)

( * ) Notice: Subject to any disclaimer, the term of this patent is extended or adjusted under 35 U.S.C. 154(b) by 0 days.

(21) Appl. No.: 09/154,129

(22) Filed: Sep. 16, 1998

Related U.S. Application Data

(60) Provisional application No. 60/059,082, filed on Sep. 16, 1997, and provisional application No. 60/059,847, filed on Sep. 16, 1997.

(51) Int. Cl.$^7$ .................................................. H04L 9/00

(52) U.S. Cl. ......................................................... 713/164

(58) Field of Search ................................. 713/164, 165, 713/166, 167, 190, 191, 200

(56) References Cited

U.S. PATENT DOCUMENTS

| | | | |
|---|---|---|---|
| 4,562,305 A | * 12/1985 | Gaffney, Jr. et al. | ........ 713/190 |
| 4,987,595 A | 1/1991 | Marino, Jr. et al. | |
| 5,557,346 A | 9/1996 | Lipner et al. | |
| 5,623,545 A | 4/1997 | Childs et al. | |
| 5,631,960 A | 5/1997 | Likens et al. | |
| 5,721,777 A | 2/1998 | Blaze | |
| 6,070,198 A | * 5/2000 | Krause et al. | ............ 709/321 |

* cited by examiner

*Primary Examiner*—Matthew Smithers
(74) *Attorney, Agent, or Firm*—Hoffman & Baron, LLP

(57) ABSTRACT

Cryptographic service software embodied on a hard disc or a floppy disc electronically communicates with a standard operating system of a personal computer. The operating system has an application space and a kernel space. The cryptographic service software performs cryptographic services in the kernel space of the operating system. The cryptographic service software includes a kernel space level application programming interface and a cryptographic service module having a library of encryption algorithms.

4 Claims, 1 Drawing Sheet

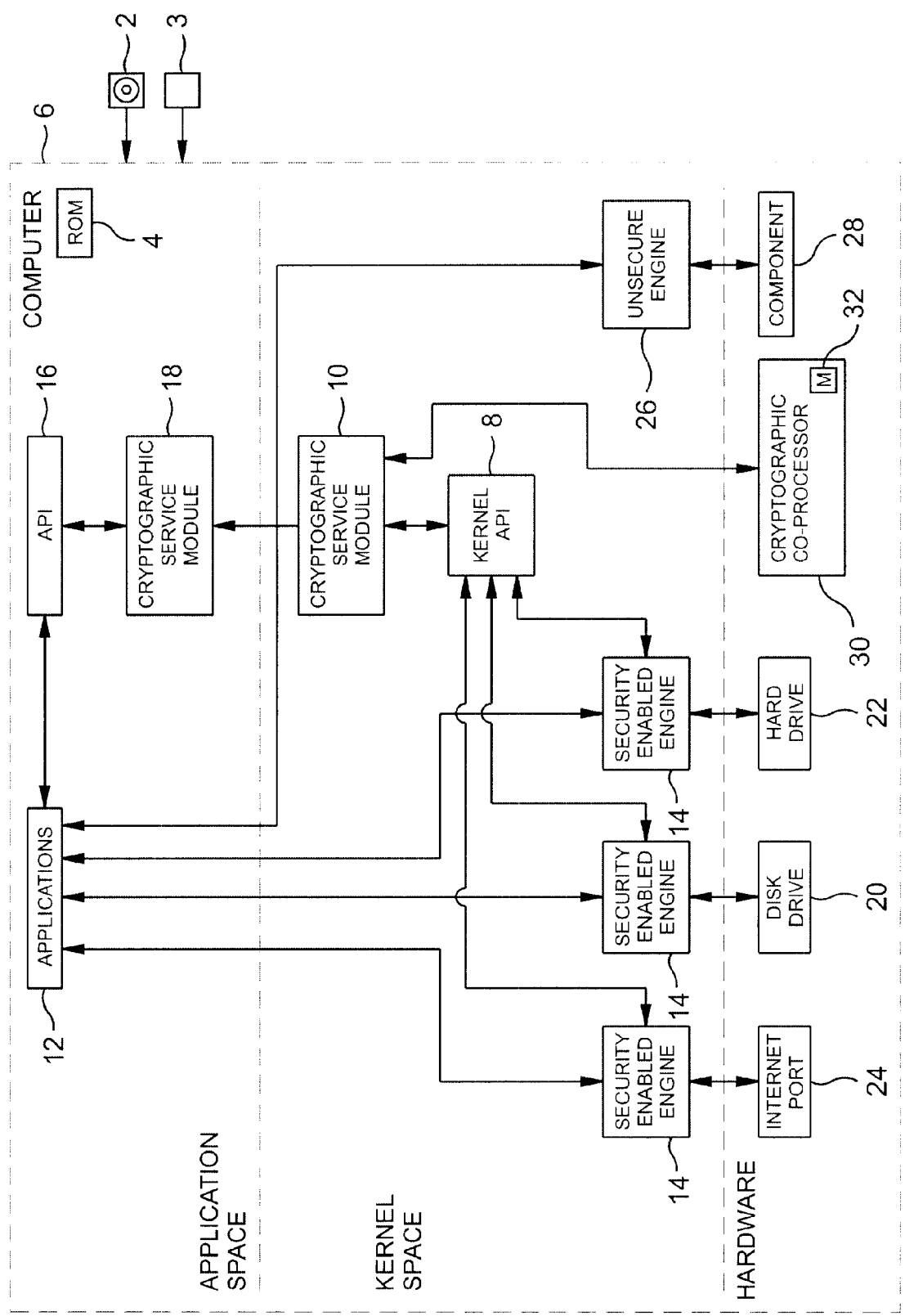

EXTENDING CRYTOGRAPHIC SERVICES TO THE KERNEL SPACE OF A COMPUTER OPERATING SYSTEM

CROSS-REFERENCE TO RELATED APPLICATIONS

This application is based on Provisional Patent Application Serial Nos. 60/059,082 and 60/059,847, each of which was filed on Sep. 16, 1997, and relates to U.S. Patent Application entitled "Cryptographic Co-Processor", Ser. No. 09/154,443,. filed concurrently herewith, the disclosures of which are incorporated herein by reference.

BACKGROUND OF THE INVENTION

1. Field of the Invention

This invention relates to computer operating systems for a personal computer or the like, and more particularly relates to computer operating systems which provide cryptographic services.

2. Description of the Prior Art

There is currently on the market software for personal computers which provide cryptographic services. In particular, Microsoft Corporation provides its CryptoAPI (™) software for its Windows (™) operating system. The CryptoAPI (™) software is a modular way to provide cryptographic (e.g., encryption) services to applications. For example, an E-mail encryption package on one's personal computer running in Windows (™) will most likely be using the services CryptoAPI (™) to perform the encryption processes.

CryptoAPI (™) software is designed to be modular in that it includes a generic layer plus a replaceable library of encryption algorithms, referred to as a cryptographic service provider (CSP) module. The CSP module is software which is implemented in the form of a dynamic linked library (DLL) residing in the application space of the operating system. The CSP module contains many encryption algorithms, such as DES, triple DES, hashing algorithms, digital signature algorithms, etc. Since algorithms may change, and the rules of cryptography may change, the CSP module may be replaced with an updated version having new encryption algorithms. The new CSP module is designed to be compatible with the generic layer of the CryptoAPI (™) program.

CryptoAPI (™) software operates only in the application space of the operating system of the personal computer (PC). Therefore, it can only be called upon by an application, such as E-mail, MicroSoft Word (™), Excel (™), or the like.

The CryptoAPI (™) software cannot work in the kernel space of the operating system. The kernel space is that layer of the operating system which is essentially non-visible to the user, in other words, at the driver level of the PC, for example, where IP (Internet Protocol) packets are processed, where the disc drive controller software resides, where the PC's printer drivers are located, etc.

Kernel space routines cannot cross the line into application space very efficiently and use the services of CryptoAPI (™) software in the application space. Therefore, if one wants to encrypt data or instructions coming in or out of the hard drive, the CryptoAPI (™) software would not be usable, as it resides in the application space and not in the kernel space. Similarly, the IP packets would also not be able to be encrypted using the CryptoAPI (™) software, as the IP packets are processed in the kernel space.

OBJECTS AND SUMMARY OF THE INVENTION

It is an object of the present invention to define an implementation of cryptographic services in the kernel space of a computer operating system.

It is another object of the present invention to define the implementation of cryptographic services in the kernel space of a computer operating system which is linked to similar cryptographic services provided in the application space.

It is still another object of the present invention to provide an implementation of cryptographic services for an operating system usable in a personal computer which is capable of encrypting hard drive data and IP packets at the driver level of the personal computer.

In accordance with one form of the present invention, cryptographic service software is embodied in at least one of a hard disc, a floppy disc or a read-only memory (ROM). The cryptographic service software electronically communicates and is compatible with a standard operating system of a computer, such as MicroSoft Windows (™). The operating system includes an application space and a kernel space. The cryptographic service software performs cryptographic services at the kernel space of the operating system. The cryptographic service software includes a generic layer having a kernel space level program interface, and a cryptographic service module having a library of encryption algorithms. This module may be replaced with a different module having updated or at least different encryption algorithms.

In another form of the present invention, cryptographic service software is situated in each of the application space and kernel space of a standard operating system for a computer. The separate application space and kernel space software are linked together to exchange cryptographic functions, such as algorithms, digital signatures and hash functions and secret key material. Each of the application space and kernel space cryptographic software includes a generic layer having a program interface, and a cryptographic service module having a library of encryption algorithms, which module electronically communicates with the program interface. Each module is preferably replaceable, as mentioned previously.

These and other objects, features and advantages of the present invention will become apparent from the following detailed description of illustrative embodiments thereof, which is to be read in connection with the accompanying drawings.

BRIEF DESCRIPTION OF THE DRAWINGS

The FIGURE is a block diagram illustrating the implementation of a cryptographic service software in accordance with the present invention.

DETAILED DESCRIPTION OF THE PREFERRED EMBODIMENTS

In accordance with one form of the present invention, cryptographic service software similar in operation and structure to the CryptoAPI (™) software sold by MicroSoft Corporation is preferably embodied in either a hard disc 3, floppy disc 2 or a read-only memory (ROM) 4. The ROM 4 or hard disc 3 may be situated in a personal computer 6 or other piece of electronic equipment, and the floppy disc 2 may be received and read by a disc drive of the computer 6 or other equipment.

The cryptographic service software is compatible and communicates with a standard operating system of a computer, such as the Windows (™) operating system. Unlike the CryptoAPI (™) software, the cryptographic service software of the present invention is situated in the kernel space of the operating system, at the driver level of the computer. The cryptographic service software performs cryptographic services using encryption algorithms and the like at the kernel space of the operating system.

The cryptographic service software is structured similarly to that of the CryptoAPI (™) software. It includes a generic layer having a kernel space level program interface 8, which functions and operates in a manner similar to the application program interface of the CryptoAPI (™) software. It further includes a cryptographic service module 10 which may be embodied in a similar manner to that of the CryptoAPI (™) software. The cryptographic service module 10 preferably includes a library of encryption algorithms. The module electronically communicates and cooperates with the kernel application programming interface 8. This module may be replaced with a different module having new or different encryption algorithms.

The cryptographic service software allows one to write code at the driver level of the computer in a manner similar to the way the CryptoAPI (™) software does at the higher, application level. Now, encryption algorithms may be used to encrypt signals at the driver level, such as at the Ethernet port or at the modem port, video card or disk drive, etc., that is, at a level where the conventional CryptoAPT (™) software cannot reach. The cryptographic service software at the driver level is still accessible by application software 12 through secured drivers (engines) 14 situated at the driver level. Also, advantageously, during software development, the cryptographic software code at the kernel level may be debugged at the application level.

Preferably, and as shown in the figure, a cryptographic service software is situated at each of the application space and the kernel space, and the two are linked together. Each cryptographic service software may be loaded from a floppy disc 2 onto a computer 6 or may be embodied in a read only memory (ROM) 4. The application space software includes an application program interface 16 and a cryptographic service module 18 electronically communicating with the application programming interface 16. The kernel space cryptographic software includes a kernel space level program interface 8 and a cryptographic service module 10 electronically communicating with the kernel space level program interface 8. Each of the cryptographic service modules 10, 18 preferably includes a library of encryption algorithms and the like. Preferably, the modules are linked together to exchange algorithms, for example, or share secret key material between the two. This link facilitates the operation of the computer 6 and the exchange of encrypted material from one computer to another because the application level cryptographic software may wish to use the same pre-arranged keys in its application level communications as are used at the kernel level, such as for encrypting and decrypting, IP packets.

In another form of the present invention, it is envisioned that there are a plurality of security enabled kernel engines 14 situated in the kernel space. These security enabled kernel engines 14 communicate with and drive various components, such as a disk drive 20, hard drive 22 and internet port 24 of the computer. Each security enabled kernel engine 14 electronically communicates with preferably the same kernel space program interface 8 of the kernel cryptographic service software. The advantage in this arrangement is that the cryptographic service software and module thereof may be shared by many different kernel engines 14 as opposed to incorporating in each kernel engine an encryption algorithm. Of course, there may be unsecured engines 26 situated in the kernel space communicating with and driving other components 28 for which cryptographic services are not required. Nevertheless, each of the security enabled kernel engines 14 and unsecured engines 26 communicate with the application software 12.

Preferably, the kernel space cryptographic service software and, in particular, the kernel space program interface 8 hereof, electronically communicates with other hardware crypto devices such as the cryptographic co-processor 30 disclosed in U.S. patent application Ser. No. 09/154,443, entitled "Cryptographic Co-Processor" filed concurrently herewith, the disclosure of which is incorporated herein by reference. The cryptographic co-processor 30 has mask-programmed in a memory 32 thereof a library of encryption algorithms and the like. Accordingly, the cryptographic service software situated at the kernel space is linked not only to the cryptographic service software situated at the application level, but also to a hardware cryptographic device, such as the co-processor 30 mentioned previously. Therefore, the application software may utilize the cryptographic library in the kernel space, which is preferably pure software, or the cryptographic library in the co-processor 30, which is essentially hardware.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A cryptographic service software embodied in at least one of a hard disc, a floppy disc and a read-only memory (ROM) the cryptographic service software electronically communicating and being compatible with a standard operating system of a computer, the operating system having an application space and a kernel space, the cryptographic service software performing cryptographic services in the kernel space of the operating system, which comprises:

a generic layer including a kernel space level program interface; and a cryptographic service module having a library of encryption algorithms, the module electronically communicating and cooperating with the kernel space level program interface, the kernel space level program interface enabling the encryption algorithms to be modularly modified without modification to the kernel space external to the cryptographic service software.

2. In combination, a first cryptographic service software embodied in at least one of a floppy disc and a read only memory (ROM), the first cryptographic service software electronically communicating and being compatible with a standard operating system of a computer, the operating system having an application space and a kernel space, the cryptographic service software performing cryptographic services in the application space of the operating system, the first cryptographic service software comprising an application program interface and a first cryptographic service module, the first cryptographic service module having a library of encryption algorithms, the first cryptographic service module electronically communicating and cooperating with the application program interface, the application program interface enabling the encryption algorithms to be modularly modified without modification to the application space external to the first cryptographic service software; and a second cryptographic service software embodied in at least one of a floppy disc and a read only memory (RM), the second cryptographic service software electronically communicating and being compatible with the operating system of the computer, the second cryptographic service software performing cryptographic services in the kernel space of the operating system, the second cryptographic service software including a kernel space level program interface and a second cryptographic service module, the second cryptographic service module having a library of encryption algorithms, the second cryptographic service module electronically communicating and cooperating with the kernel space level program interface, the kernel space level program interface enabling the encryption algorithms to be modularly modified without modification to the kernel space external to the second cryptographic service software.

3. A computer having an operating system, the operating system including an application space and a kernel space, which comprises:

at least one security enabled kernel engine situated in the kernel space of the operating system;

cryptographic service software, the cryptographic service software being situated at least in the kernel space of the operating system, the cryptographic service software including at least one program interface electronically communicating with the at least one security enabled kernel engine, and at least one cryptographic service module electronically communicating with the at least one program interface, the at least one cryptographic service module including a library of encryption algorithms, the at least one program interface enabling the encryption algorithms to be modularly modified without modification to the kernel space external to the cryptographic service software.

4. A computer as defined by claim 3, which further comprises:

a cryptographic co-processor, the cryptographic co-processor including a memory and a second library of encryption algorithms mask-programmed into the memory, the co-processor electronically communicating with the at least one program interface of the cryptographic service software.

* * * * *